Jan. 10, 1961  J. W. GLUSIC  2,967,687
THRUST MEMBER ADJUSTMENT AND LOCK
Filed April 4, 1957
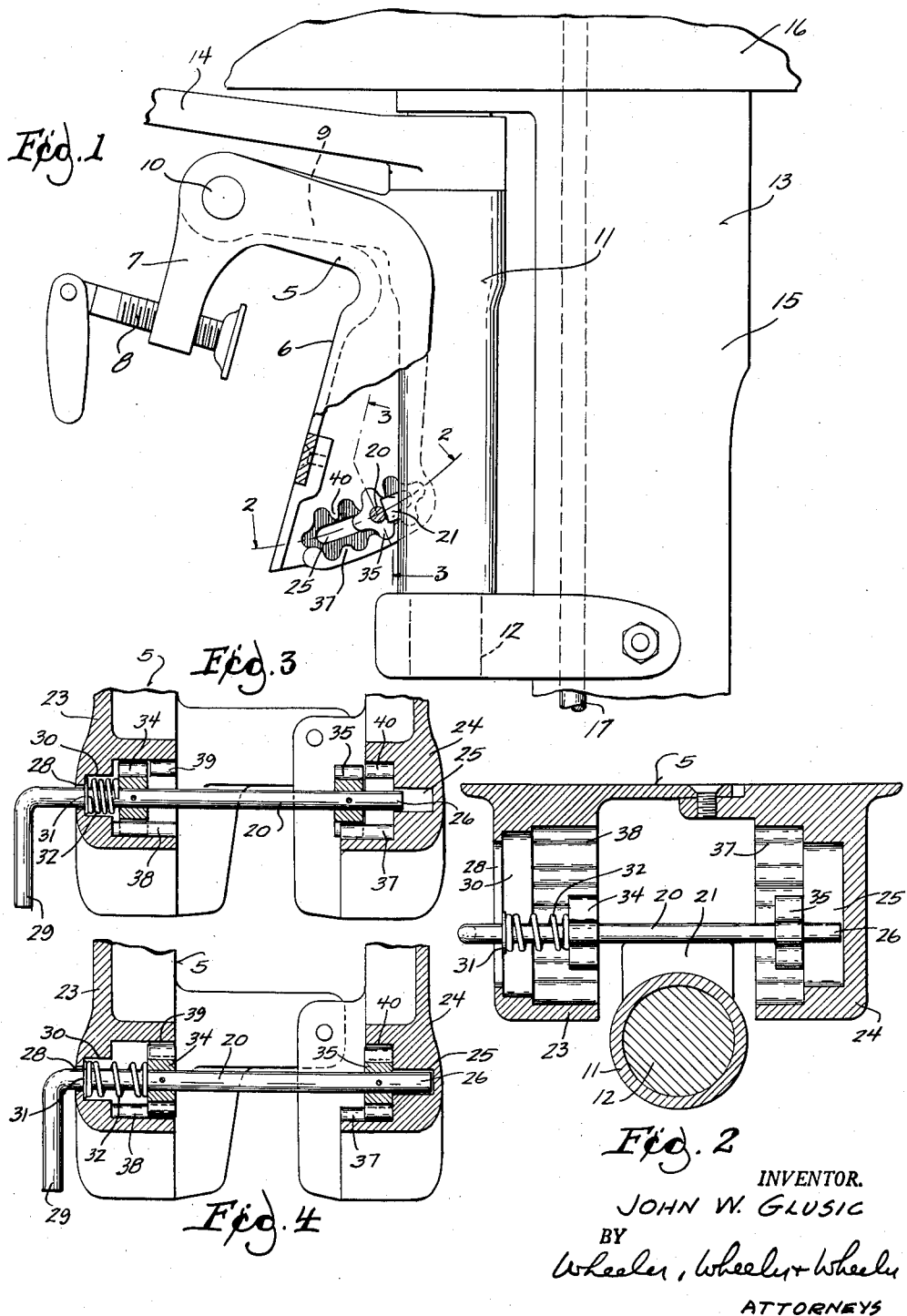
INVENTOR.
JOHN W. GLUSIC
BY
Wheeler, Wheeler + Wheeler
ATTORNEYS United States Patent Office 2,967,687
Patented Jan. 10, 1961

2,967,687

THRUST MEMBER ADJUSTMENT AND LOCK

John W. Glusic, Waukegan, Ill., assignor to Outboard Marine Corporation, Waukegan, Ill., a corporation of Delaware Filed Apr. 4, 1957, Ser. No. 650,710

8 Claims. (Cl. 248—4)

This invention relates to a thrust member adjustment and lock for controlling the angle of an outboard motor propulsion unit.

A wide variety of devices have been proposed for determining the intial upright position of adjustment of the propulsion unit of an outboard motor. The adjustable member with which the invention is concerned must receive the thrust of the propulsion unit while leaving the unit free for tilting about its transverse axis when a submerged obstacle is encountered.

The present device provides greater ease and security of adjustment. To secure these objectives, the member which takes the propulsion thrust is a transverse bar which is mounted in slots of the arms of the transom bracket to be movable longitudinally of the slots for adjusment purposes and being movable axially of its own length to and from locked position. It is subject to a spring which urges it axially toward a position in which one or more gear elements mounted on the bar are engaged with opposed fixed teeth carried by the transom bracket. When the bar is moved axially, its gear or gears are disengaged from one of the fixed teeth but remain in engagement with the opposed set of teeth whereby a rotation of the bar will cause its gear or gears to roll in the more enlongated fixed teeth to a new position of adjustment. Upon release of the bar, its spring bias will urge its gear or gears into mesh with the shorter fixed teeth, thereby precluding further adjustment movement.

In the drawings:

Fig. 1 is a fragmentary view of a transom bracket and propulsion unit of an outboard motor, a portion of the transom bracket being broken away to expose the adjusting and locking structure of the invention.

Fig. 2 is a view taken in section on line 2—2 of Fig. 1.

Fig. 3 is a view taken in section on line 3—3 of Fig. 1 showing the bar retracted axially to a position in which its gear teeth are disengaged from the shorter fixed gear teeth and remain in mesh only with the longer ones, thereby leaving the bar free to rotate for advance to a new position.

Fig. 4 is a view similar to Fig. 3 showing the bar released and advanced subject to its axial bias to a position in which its teeth are engaged with both of the sets of fixed teeth, whereby the bar is non-rotatable and therefore locked.

The transom bracket 5 has generally conventional transom engaging clamp surfaces 6 and arms 7 provided with setscrews 8 for connecting the bracket to a boat transom.

Between the two sides of the bracket is the arm 9 which is pivoted on the transverse pintle 10 of the bracket and which supports the swivel bearing 11 in which the kingpin 12 of the propulsion unit 13 is pivoted for steering purposes. The tiller 14 controls the dirigible parts and is connected with the shaft housing 15 which extends downwardly from the powerhead 16 in the usual way.

In order that the shaft housing may be positioned to hold the drive shaft 17 approximately upright (or in whatever position may be preferred), a stop is provided to limit the oscillation of the propulsion unit about the pintle 10 of the transom bracket. This stop should be easily adjustable and secure when adjusted. For this purpose, I provide the bar 20 as a thrust receiving means engaged by the abutment 21 which serves as a thrust member mounted on the propulsion unit. In this instance, the thrust member 21 is fixed to project forwardly from the swivel bearing 11 in which the kingpin 12 is rotatable.

As best shown in Fig. 2, the transom bracket 5 comprises a pair of laterally spaced arms 23, 24. The arm 24 has a guide opening 25 in the form of a blind channel in which the end 26 of bar 20 is confined. The arm 23 has a similar elongated opening 28 in the form of a slot through which the end of bar 20 projects. The margins of the arms bounding said openings provide ways in which bar 20 has translative movement. Mesh of its pinions with rack teeth as hereinafter described constrains the two ends of the bar to move equally.

Externally of the bracket arm 23 the bar is provided with a handle 29. Within the arm 23 and centered respecting the slot 28, the opening 28 is enlarged at 30 to provide opposite shoulders engaged by a washer 31 against which is seated the compression spring 32 which biases bar 20 to the right as viewed in Figs. 2 and 4. The bias of spring 32 is transmitted to the bar through a gear or pinion 34 which is fixed to the bar. The bar may also be provided with a similar gear or pinion at 35 which bears a relation to bracket arm 24 comparable to the relation between pinion 34 and bracket arm 23.

Below the channel-shaped elongated opening 25 in bracket arm 24, the arm is provided with a series of fixed teeth 37 with which the teeth of pinion 35 mesh. However, the fixed teeth have an axial extent considerably in excess of the axial extent of the pinion 35, whereby the mesh between the pinion and the fixed rack teeth 37 will be maintained whether the pinion is in the position shown in Fig. 3 or in the position shown in Fig. 4.

Bracket arm 23 has a similar set of relatively elongated fixed rack teeth 38 below bar 20 and with which the teeth of pinion 35 are permanently in mesh in all positions of the bar.

Above the bar, and to the right of the positions of pinions 34 and 35 when these are retracted with the bar as shown in Fig. 3, I provide shorter sets of rack teeth respectively designated 39 and 40. When the bar and pinions are pulled to the left against the bias of spring 32 as shown in Fig. 3, the respective pinions 34 and 35 are disengaged from the fixed rack teeth 39 and 40 above the bar but remain in engagement with the fixed rack teeth 38 and 37 below the bar. In this position of the parts, the bar is readily adjustable to a new position longitudinally of the channeled openings in the bracket through the simple expedient of rotating the bar by means of its handle 29, thereby causing the pinions to roll along the sets of fixed teeth at 38 and 37.

However, upon reaching the desired position of adjustment, the handle 29 of bar 20 is released. This permits the bias of spring 32 to urge the bar and its pinions to the right as viewed in Figs. 2 to 4, whereupon the pinions 34 and 35, still remaining in mesh with the lower rack teeth 38 and 37, are re-engaged with the upper relatively fixed but shorter rack teeth 39 and 40. Rotation of the pinions now being impossible, the bar 20 is locked in the selected position of adjustment to receive the thrust of the abutment 21 of the propulsion unit, thereby maintaining that unit at an angle of oscillation on its fulcrum 10 which corresponds with the new position of the bar.

It will be evident that the rolling engagement of the pinion or pinions on the fixed rack teeth with which it or they are permanently engaged provides an extremely simple and easily operable means of moving the bar from one position of adjustment to another. It will be equally evident that when the new position is reached, the axial displacement of the pinions to engage the opposed set of fixed rack teeth provides a simple and very effective means of precluding further movement of the bar in a propulsion unit-adjusting direction. In other words, the adjustment, once achieved, is satisfactorily fixed until further adjustment is required.

I claim:

1. In a device of the character described, the combination with a bar having generally radially projecting teeth and mounted for axial, rotative and translative movement, of means providing opposed sets of rack teeth with which the teeth of the bar are respectively engaged and engageable, one set of rack teeth having sufficient extent so that the teeth of the bar are permanently registered therewith during normal operation, and the other set of rack teeth being sufficiently shorter than the rack teeth first mentioned so that the teeth of the bar may be moved axially to and from engagement with the rack teeth of the second set, the spacing between the rack teeth corresponding to the spacing of the teeth of the bar whereby, when the bar teeth are engaged with both sets of rack teeth, the bar is fixed against rotation.

2. The device of claim 1 in which the bar is provided with means biasing it toward a position in which its teeth are engaged with both sets of rack teeth.

3. In an outboard motor, which includes a propulsion unit having a thrust member, a transom bracket provided with a transverse pintle upon which said unit is pivoted, the said bracket being provided with laterally spaced arms spanned by a thrust-receiving bar for positioning said member, said bar being provided with axially spaced pinions, the bracket arms having fixed rack teeth with which said pinions are in rolling mesh for effecting the adjustment of said bar along the path of oscillation of said thrust member as the bar is rotated, and lock means engageable with said pinions in one position thereof to prevent rotation of said pinions, whereby to transmit thrust from said bar through said pinions to said rack teeth.

4. In an outboard motor which includes a propulsion unit having a thrust member, a transom bracket provided with a transverse pivot upon which said unit is pivoted, the said bracket being provided with laterally spaced arms spanned by a thrust-receiving bar for positioning said member, said bar being provided with axially spaced pinions, the bracket arms having fixed rack teeth with which said pinions are in rolling mesh for effecting the adjustment of said bar along the path of oscillation of said thrust member as the bar is rotated, at least one arm of the transom bracket being provided with a set of rack teeth disposed at the opposite side of the path of bar movement and opposed to said set of the rack teeth first mentioned and of different length, the respective pinion being movable between a first position of concurrent engagement with both sets of rack teeth and another position of engagement with but said first mentioned set of rack teeth.

5. In an outboard motor which includes a propulsion unit having a thrust member, a transom bracket provided with a transverse pivot upon which said unit is pivoted, the said bracket being provided with laterally spaced arms spanned by a thrust-receiving bar for positioning said member, said bar being provided with axially spaced pinions, the bracket arms having fixed rack teeth with which said pinions are in rolling mesh for effecting the adjustment of said bar along the path of oscillation of said thrust member as the bar is rotated, said bracket arms being further provided with elongated openings in which said bar is guided for axial, rotary, and translative movement and with rack teeth of shorter length than the rack teeth first mentioned and disposed at opposite sides of respective openings, one of said openings comprising a slot through which said bar projects, the bar being provided with a handle externally of the slotted arm, and a spring seat spanning the slot and provided with a spring engaging said seat and having a second seat connected with the bar, said spring biasing the bar toward a position in which the respective pinions are engaged with both sets of respective rack teeth, whereby the bar is locked against translative movement, the pinions being fast to the bar, whereby they may be retracted by the handle to another position in which they remain in mesh with corresponding sets of rack teeth first mentioned and are free of respective opposed sets of rack teeth for translative movement upon rotation of the bar.

6. In an outboard motor having a pivoted propulsion unit carrying a thrust member, an improved bracket including a pair of spaced arms, the thrust member being movable between the arms in the pivotal adjustment of said unit, and thrust receiving means engaged by said thrust member to determine the position of said unit and including a bar extending transversely between said arms and for which said arms provide ways, the respective arms being provided with relatively fixed rack teeth along said ways, and the bar having pinions mounted upon it and meshing with the rack teeth of the respective arms for effecting translative movement of the bar in the course of pinion rotation, and a second set of rack teeth carried by one of said arms and with respect to which at least one of said pinions is axially adjustable between a first position in which the last mentioned pinion is engaged with both sets of rack teeth of its respective arm and a second position in which the pinion is engaged with the rack teeth of only one of said sets, said last mentioned rack teeth being longer axially of the pinion than the rack teeth of the other of said last mentioned sets, and means for effecting pinion movement between said positions.

7. A mounting for outboard botors comprising a stern bracket having clamping means for securing it to the transom of a boat, an outboard motor supporting member pivotally mounted on said stern bracket for swinging movement about a horizontal axis disposed transversely of said boat, said stern bracket having a pair of downwardly depending arms engageable with the rear of said transom, each of said arms having an elongated recess therein and a slot therethrough at the bottom of said recess, a pair of oppositely facing racks in the recess of each arm disposed on opposite sides of the slot therein, one rack of each pair being narrower than the other, and adjustable means for limiting the downward swinging movement of said outboard motor supporting member, said adjustable means including a shaft extending through the slots in said arms, a pair of pinions secured to said shaft, said pinions being located respectively in the recesses of said arms in meshing engagement with the racks therein and said shaft extending outwardly from one of said arms, and manual operating means secured to the outwardly extending end of said shaft for manipulating said shaft, said shaft being shiftable axially thereof to move said pinions out of meshing engagement with the narrower racks in said arms while maintaining said pinions in meshing engagement with the other racks in said arms and being then rotatable to move said shaft transversely to a new position as said pinions translate along said other racks and being then returnably shiftable axially thereof to move said pinions back into meshing engagement with the narrower racks in said arms to secure said shaft in said new position.

8. A mounting as claimed in claim 7 including a spring between said manual operating means and the adjacent arm for tending to maintain said shaft axially in position to engage said pinions with the narrower racks in said arms.

(References on following page)

References Cited in the file of this patent

UNITED STATES PATENTS

| | | |
|---|---|---|
| 1,234,929 | Nicolaysen | July 31, 1917 |
| 1,535,698 | Swanson | Apr. 28, 1925 |
| 2,213,434 | Rayniak | Sept. 3, 1940 |
| 2,441,000 | Armstrong | May 4, 1948 |
| 2,454,972 | Martin | Nov. 30, 1948 |
| 2,684,044 | Kiekhaefer | July 20, 1954 |
| 2,702,517 | Armstrong | Feb. 22, 1955 |

FOREIGN PATENTS

| | | |
|---|---|---|
| 5,029 | Switzerland | Mar. 30, 1892 |